US006887558B2

(12) United States Patent
Simpson et al.

(10) Patent No.: US 6,887,558 B2
(45) Date of Patent: May 3, 2005

(54) INTERMEDIATE TRANSFER MEMBER FOR ELECTROPHOTOGRAPHIC PROCESS

(75) Inventors: Charles W. Simpson, Lakeland, MN (US); Leonard J. Stulc, Shafer, MN (US)

(73) Assignee: Samsung Electronics Co., Ltd., Suwon (KR)

( * ) Notice: Subject to any disclaimer, the term of this patent is extended or adjusted under 35 U.S.C. 154(b) by 249 days.

(21) Appl. No.: 10/284,930

(22) Filed: Oct. 31, 2002

(65) Prior Publication Data

US 2003/0087175 A1 May 8, 2003

Related U.S. Application Data

(60) Provisional application No. 60/339,990, filed on Nov. 2, 2001.

(51) Int. Cl.[7] ............................ B32B 27/14; B32B 3/00

(52) U.S. Cl. ..................... 428/195.1; 428/421; 428/447

(58) Field of Search .............................. 428/195.1, 421, 428/447

(56) References Cited

U.S. PATENT DOCUMENTS

| | | | | |
|---|---|---|---|---|
| 5,576,818 | A | 11/1996 | Badesha et al. | 355/271 |
| 6,037,092 | A | 3/2000 | Heeks et al. | 430/124 |
| 6,319,181 | B1 | 11/2001 | Naoi et al. | 492/56 |
| 6,413,691 | B2 | 7/2002 | Daimon et al. | 430/109.4 |
| 6,434,355 | B1 | 8/2002 | Badesha et al. | 399/307 |
| 6,599,628 | B1 * | 7/2003 | Finsterwalder et al. | 428/421 |

FOREIGN PATENT DOCUMENTS

| | | | |
|---|---|---|---|
| EP | 0 638 854 | 2/1995 | G03G/15/16 |
| JP | XP002280825 | 11/1990 | B29H/9/12 |

* cited by examiner

*Primary Examiner*—B. Shewareged
(74) *Attorney, Agent, or Firm*—Mark A. Litman & Associates, P.A.

(57) ABSTRACT

This invention related to an intermediate transfer member for electrophotography that includes a substrate; and a polymeric layer on said substrate wherein the polymeric layer comprises an organic titanate and a polymer selected from the group consisting of fluorosilicone, silicone, and a combination thereof.

11 Claims, 2 Drawing Sheets

INTERMEDIATE TRANSFER MEMBER FOR ELECTROPHOTOGRAPHIC PROCESS

REFERENCE TO RELATED APPLICATIONS

This application claims benefit from the provisional Application 60/339,990 filed Nov. 2, 2001.

BACKGROUND OF THE INVENTION

1. Field of Invention

This invention relates to a novel intermediate transfer member suitable for electrophotography and, more specifically, to an intermediate transfer member comprising A) fluorosilicone or silicone and B) an organic titanate.

2. Background of the Art

In electrophotography, a photoreceptor in the form of a plate, belt, disk, sheet, or drum having an electrically insulating photoconductive element on an electrically conductive substrate is imaged by first uniformly electrostatically charging the surface of the photoconductive element, and then exposing the charged surface to a pattern of light. The light exposure selectively dissipates the charge in the illuminated areas, thereby forming a pattern of charged and uncharged areas, referred to as a latent image. A liquid or solid ink is then deposited in either the charged or uncharged areas to create a toned image on the surface of the photoconductive element.

In some electrophotographic imaging systems, the latent images are formed and developed on top of one another in register in a common imaging region of the photoreceptor. The latent images can be formed and developed in multiple passes of the photoconductor around a continuous transport path (i.e., a multi-pass system). Alternatively, the latent images can be formed and developed in a single pass of the photoconductor around the continuous transport path. A single-pass system enables the multi-color images to be assembled at extremely high speeds relative to the multi-pass pass system. At each color development station, liquid color developers are applied to the photoconductor, for example, by electrically biased rotating developer rolls. The colored liquid developer (or ink) is made of small colored pigment particles dispersed in an insulating liquid (i.e., a carrier liquid). The imaging process can be repeated many times on the reusable photoconductive element.

The visible ink image developed on the photoreceptor can be fixed to the photoreceptor surface or transferred to a surface of a suitable receiving medium such as sheets of material, including, for example, paper, metal, metal coated substrates, composites and the like. In many instances, the visible ink image is transferred first to an intermediate transfer member such as an intermediate transfer belt or intermediate transfer drum before it is transferred to a receiving medium.

The intermediate transfer member should have a high carrier fluid resistance so that it will not swell or dissolve in carrier fluids. Furthermore, the carrier intermediate transfer member should have high chemical durability and suitable dielectric property for efficient transfer of images.

Although there are many different kinds of intermediate transfer members in the art, there is always a need to provide alternative members or to improve the chemical and carrier fluid resistance and transfer efficiency of the intermediate transfer member for various electrophotographic applications.

SUMMARY OF THE INVENTION

This invention features an intermediate transfer member having high carrier fluid and chemical durability. The intermediate transfer member comprises a polymeric layer prepared from a polymeric coating composition having increased pot life, good cure at high humidity conditions, and good cure in thin layer constructions.

In a first aspect, the invention features an intermediate transfer member for the transfer of electrophotographic images or intermediate (e.g., partial) images that includes:

(a) a substrate; and (b) a polymeric layer on the substrate wherein the polymeric layer comprises an organic titanate and a polymer selected from the group consisting of fluorosilicone resins, silicone resins, and a combination thereof. During use, the intermediate transfer member will have a partial image (e.g., less than all colors that will form the final image, such as only 1, 2 or 3 colors out of the normal four-color image that is formed) or a complete image (e.g., all 3 colors or all four colors, depending on the nature of the total image to be formed) carried on the polymeric surface. This image is carried, rather than permanently bonded to the surface, so that the image can be transferred to another surface, such as the surface of a permanent image receptor (e.g., paper or specialty receptor).

In a second aspect, the invention features a process of making an intermediate transfer member for electrophotographic that includes the steps of:

(a) providing a substrate;

(b) applying a polymeric coating composition on the substrate wherein the polymeric coating composition comprises an organic titanate, a solvent, and a polymer selected from the group consisting of fluorosilicone resins, silicone resins, and a combination thereof.

(c) removing said solvent from the polymeric coating composition to form a polymeric layer on said substrate.

A method of using the intermediate electrophotographic imaging member comprises contacting the electrophotographic image on the temporary surface with a receptor surface and transferring the electrophotographic image to the receptor. This may be done with or without substantive pressure and heat, as needed.

Other features and advantages of the invention will be apparent from the following description of the preferred embodiments thereof, and from the claims.

DETAILED DESCRIPTION OF THE INVENTION

Liquid electrophotography is a technology which produces or reproduces an image on paper or other desired receiving material. Liquid electrophotography uses liquid inks which may be black or which may be of different colors for the purpose of plating solid black or colored material onto a surface in a well-controlled and image-wise manner to create the desired prints. In some cases, liquid inks used in electrophotography are substantially transparent or translucent to radiation emitted at the wavelength of the latent image generation device so that multiple image planes can be laid over one another to produce a multi-colored image constructed of a plurality of image planes with each image plane being constructed with a liquid ink of a particular color. The transparency is desired to enable transmission of wavelengths through earlier deposited images to enable charge differentiation by subsequent exposures to radiation form the latent image generating device. Typically, a colored image is constructed of four image planes. The first three planes are constructed with a liquid ink in each of the three subtractive primary printing colors, yellow, cyan and magenta. The fourth image plane uses black ink, which need not be transparent to radiation emitted at the wavelength of the latent image generation device.

Figure 1:
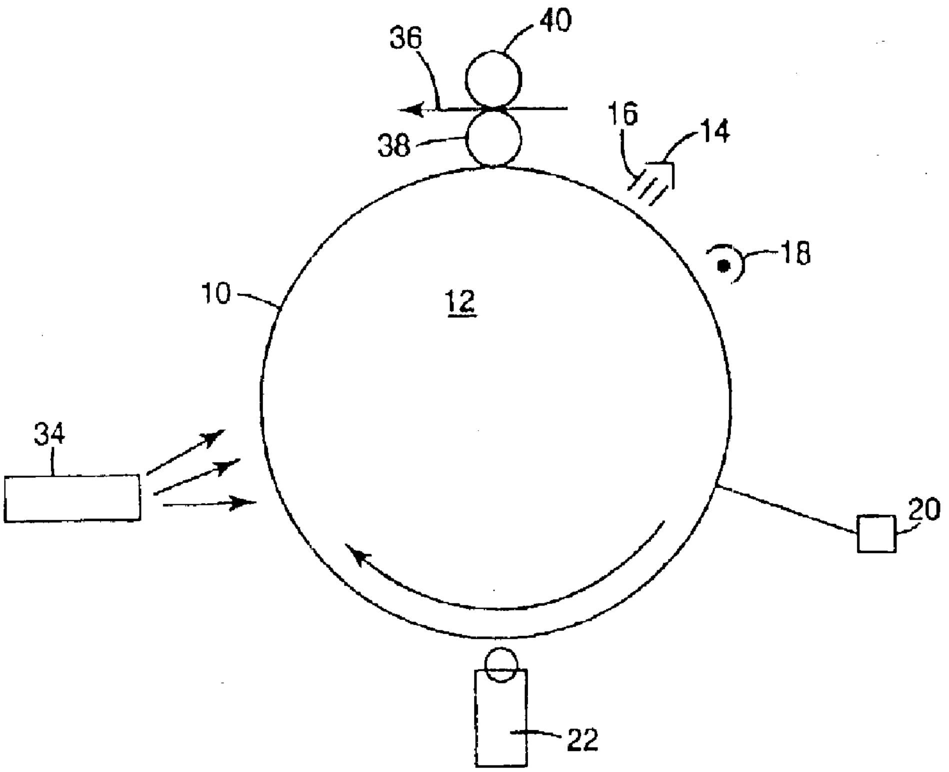
FIG. 1 is a diagrammatic illustration of a basic liquid electrophotographic process in which the present invention has utility and an apparatus for performing that process.

The typical process involved in liquid electrophotography can be illustrated with respect to a single color by reference to FIG. 1. Light sensitive, photoreceptor 10 is arranged on or near the surface of a mechanical carrier such as drum 12. Photoreceptor 10 can be in the form of a belt or loop mounting on the outer surface of the drum. The mechanical carrier could, of course, be a belt or other movable support object. Drum 12 rotates in the clockwise direction of FIG. 1 moving a given location of photoreceptor 10 past various stationary components which perform an operation relative to photoreceptor 10 or an image formed on drum 12.

Of course, other mechanical arrangements could be used which provide relative movement between a given location on the surface of photoreceptor 10 and various components which operate on or in relation to photoreceptor 10. For example, photoreceptor 10 could be stationary while the various components move past photoreceptor 10 or some combination of movement between both photoreceptor 10 and the various components could be facilitated. Alternatively, mirror reflected radiation or focused collimated radiation (e.g., lasers) can be used to scan over a stationary photoreceptor surface. It is only important that there be relative movement between photoreceptor 10 or the photo-emitting source and the other components. As this description refers to photoreceptor 10 being in a certain position or passing a certain position, it is to be recognized and understood that what is being referred to is a particular spot or location on photoreceptor 10 which has a certain position or passes a certain position relative to the components operating on photoreceptor 10.

In FIG. 1, as drum 12 rotates, photoreceptor 10 moves past erase lamp 14. When photoreceptor 10 passes under erase lamp 14, radiation 16 from erase lamp 14 impinges on the surface of photoreceptor 10 causing any residual charge remaining on the surface of photoreceptor 10 to "bleed" away. Thus, the surface charge distribution of the surface of photoreceptor 10 as it exits erase lamp 14 is quite uniform and nearly zero depending upon the photoreceptor.

As drum 12 continues to rotate and photoreceptor 10 next passes under charging device 18, such as a roll corona, a uniform positive or negative charge is imposed upon the surface of photoreceptor 10. In a preferred embodiment, the charging device 18 is a positive DC corona and the surface of photoreceptor 10 is uniformly charged to around 600–1000 volts depending on the capacitance of photoreceptor, while the electrically conductive substrate of the photoreceptor is grounded or controlled at a less positive or even negative voltage. In another preferred embodiment, the charging device 18 is a negative DC corona and the surface of photoreceptor 10 is uniformly charged to around −600–1000 volts depending on the capacitance of photoreceptor, while the electrically conductive substrate of the photoreceptor is grounded or controlled at a less negative or even positive voltage. This prepares the surface of photoreceptor 10 for an image-wise exposure to radiation by laser scanning device 20 as drum 12 continues to rotate. Wherever radiation from laser scanning device 20 impinges on the surface of photoreceptor 10, the surface charge of photoreceptor 10 is reduced significantly while areas on the surface of photoreceptor 10 which do not receive radiation are not appreciably discharged. Areas of the surface of photoreceptor 10 which receive some radiation are discharged to a degree that corresponds to the amount of radiation received. This results in the surface of photoreceptor 10 having a surface charge distribution which is proportional to the desired image information imparted by laser scanning device 20 when the surface of photoreceptor 10 exits from under laser scanning device 20.

As drum 12 continues to rotate, the surface of photoreceptor 10 passes by liquid ink developer station 22. The operation of liquid ink developer station 22 can be more readily understood by reference to FIG. 2. Liquid ink 24 is applied to the surface of image-wise charged photoreceptor 10 in the presence of a positive or negative electric field which is established by placing developer roll 26 near the surface of photoreceptor 10 and imposing a bias voltage on developer roll 26. Liquid ink 24 consists of positively or negatively charged "solid", but not necessarily opaque, ink particles of the desired color for this portion of the image being printed. The "solid" material in the ink, under force from the established electric field, migrates to and plates upon the surface of photoreceptor 10 in areas 28 where the surface voltage is less than the bias voltage of developer roll 26. The "solid" material in the ink will migrate to and plate upon the developer roll in areas 30 where surface voltage of photoreceptor 10 is greater than the bias voltage of developer roll 26. Excess liquid ink not sufficiently plated to either the surface of photoreceptor 10 or to developer roll 26 is removed.

The ink may be dried as needed by drying mechanism 32 which may include a drying roll, drying belt, vacuum box, heating source such as heated rolls, ovens, and heat lamps, or curing station. Drying mechanism 32 substantially transforms liquid ink 24 into a substantially dry ink film. The excess liquid ink 24 then returns to liquid ink developer station 22 for use in a subsequent operation. The "solid" portion 28 (ink film) of liquid ink 24 plated upon the surface of photoreceptor 10 matches the previous image-wise charge distribution previously place upon the surface of photoreceptor 10 by laser scanning device 20 and, hence, is an image-wise representation of the desired image to be printed.

Referring again to FIG. 1, ink film 28 from liquid ink 24 is further dried by drying mechanism 34. Drying mechanism 34 may be passive, may utilize active air blowers, or may include other active devices such as rollers or belts coated with absorbing materials. In a preferred embodiment, drying mechanism 34 is a drying member comprising a substrate coated with an absorbent layer having at least an absorbent material. The drying member may be in the form of sheet, disk, drum, seamed or seamless belt, roll, or a sheet around a drum.

The substrate of the drying member may be opaque or substantially transparent. The substrate may comprise any suitable components giving the desired properties. Non-limiting examples of suitable materials for the substrate are polyester such as polyethylene terephthalate and polyethylene naphthalate, polyimide, polysulfone, polyamide, polycarbonate, vinyl resins such as polyvinyl fluoride and polystyrene, and the like. Specific examples of supporting substrates included polyethersulfone (Stabar® S-100, commercially available from ICI), polyvinyl fluoride (Tedlar®, commercially available from E.I. DuPont de Nemours & Company), polybisphenol-A polycarbonate (Makrofol®, commercially available from Mobay Chemical Company) and amorphous polyethylene terephthalate (Melinar®, commercially available from ICI Americas, Inc. and Dupont A and Dupont 442, commercially available from E.I. DuPont de Nemours & Company).

The desired thickness of the substrate depends on a number of factors, including economic consideration. The substrate typically is between 10 microns and 1000 microns thick, preferably between 25 microns and 250 microns. When the drying member is used in a liquid electrophotographic imaging member, the thickness of the substrate should be selected to avoid any adverse affects on the final device. The substrate should not be so thin that it splits and/or exhibits poor durability characteristics. The substrate likewise should not be so thick that it may give rise to early failure during cycling, a lower flexibility, and a higher cost for unnecessary material.

The absorbent material in the absorbent layer should be mechanically durable and have a high affinity to the carrier fluids, e.g., hydrocarbons, in the liquid inks. Non-limiting examples of suitable absorbent material are silicones or polysiloxanes, fluorosilicones, polyethylene, polypropylene, or a combination thereof. Preferably, the absorbing polymeric material is selected from the group consisting of silicones and fluorosilicones. Silicone(s) is a term well understood in the chemical arts and refers to polyorganosiloxanes such as polydiakylsiloxane, polydiarylsiloxane and polyalkylarylsiloxane or any combination thereof. Examples further include polymers having other dialkyl polysiloxane units (e.g., those derived from hexamethyl disiloxane, tetramethyl disiloxane, octamethyl trisiloxane, hexamethyl trisiloxane, heptamethyl trisiloxane, decamethyl tetrasiloxane, trifluoropropyl heptamethyl trisiloxane or diethyl tetramethyl disiloxane), linear or cyclic dialkyl polysiloxane (e.g., hexamethyl cyclotrisiloxane, octamethyl cyclotetrasiloxane, tetramethyl cyclotetrasiloxane or tetra (trifluoropropyl) tetramethyl cyclotetrasiloxane, etc.). Fluorosilicone means polymers formed by replacing at least one hydrogen atom in the alky or aryl groups of silicone by fluorine atom, preferably providing at least one alkyl or aryl group wherein at least ⅔ of the hydrogen atoms are replaced by fluorine atoms, more preferably with at least one perfluoroalkyl or perfluoroalkyl moiety (e.g., a terminal trifluoromethyl group or pentafluorophenyl group. Various background literature on polysiloxanes and fluoropolymers may be found in U.S. Pat. Nos. 6,204,329; 6,451,863; 6,403,074; 6,316,112; 6,300,025; 6,296,985; 6,258,506; 6,204,329; and 6,193,961.

The absorbent layer should not be too thin that it has a limiting absorption capacity. The absorbent layer likewise should not be so thick that it may give rise to cracking, delamination from the seamless belt substrate, and higher cost for unnecessary material. In general, the thickness of the absorbent layer is greater than 25 microns, preferably in the range of 25 to 1000 microns, more preferably in the range of 25 to 250 microns.

Optional conventional additives, such as, for example, adhesion promoters, surfactants, fillers, expandable particles, coupling agents, silanes, photoinitiators, fibers, lubricants, wetting agents, pigments, dyes, plasticizers, release agents, suspending agents, cross-linking agents, catalysts, and curing agents, may be included in the absorbent layer.

The preferred absorbent materials are cross-linked silicones and cross-linked fluorosilicones. The cross-linking of the silicones and fluorosilicones can be undertaken by any of a variety of methods including free radical reactions, condensation reactions, hydrosilylation addition reactions, hydrosilane/silanol reactions, and photoinitiated reactions relying on the activation of an intermediate to induce subsequent cross-linking. Fluorosilicones are known in the art, as represented by U.S. Pat. No. 5,576,818, which discloses an intermediate toner transfer component including: (a) an electrically conductive substrate; (b) a conformable and electrically resistive layer comprised of a first polymeric material; and (c) a toner release layer comprised of a second polymeric material selected from the group consisting of a fluorosilicone and a substantially uniform integral interpenetrating network of a hybrid composition of a fluoroelastomer and a polyorganosiloxane, wherein the resistive layer is disposed between the substrate and the release layer. U.S. Pat. No. 6,037,092 discloses a fuser member comprising a substrate and at least one layer thereover, the layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound. These patents are incorporated by reference for their disclosure of fluorosilicone polymers. Other patents incorporated by reference for the disclosure of fluorosilicone polymers are U.S. Pat. No. 6,434,355;

Preferably, the cross-linking agent is present in an amount of greater than about 0 to about 20, 0.1 to about 20, preferably about 5 to about 15, and more preferably about 8 to about 12, parts by total weight of the absorbent layer.

Commercially available examples of a cross-linking agent include those commercially available under the trade designations SYL-OFF® 7048 and 7678 (from Dow Corning, Midland, Mich.), SYLGARD® 186 (from Dow Corning, Midland, Mich.), NM203, PS 122.5 and PS 123 (from Huls America Inc.), DC7048 (Dow Corning Corp.), F-9W-9 (Shin Etsu Chemical Co. Ltd.) and VXL (O Si Specialties).

The above components are preferably reacted in the presence of a catalyst capable of catalyzing addition cross-linking of the above components to form a release coating composition. Suitable catalysts include the transition metal catalysts described for hydrosilylation in "The Chemistry of Organic Silicone Compounds," Ojima, (S. Patai, J. Rappaport eds., John Wiley and Sons, New York 1989). Such catalysts may be either heat or radiation activated. Examples include, but are not limited to, alkene complexes of Pt(II), phosphine complexes of Pt(I) and Pt(O), and organic complexes of Rh(I). Chloroplatinic acid based catalysts are the preferred catalysts. Inhibitors may be added as necessary or desired in order to extend the pot life and control the reaction rate. Commercially available hydrosilation catalysts based on chloroplatinic acid include those available under the trade designations: PC 075, PC 085 (Huls America Inc.), Syl-Off® 7127, Syl-Off® 7057, Syl-Off® 4000 (all from Dow Corning Corp.), SL 6010-D1 (General Electric), VCAT-RT, VCAT-ET (O Si Specialties), and PL-4 and PL-8 (Shin Etsu Chemical Co. Ltd.).

Other cross-linking reactions may also be used to form the cross-linked silicone polymer with a bimodal distribution of chain lengths between cross-links. Cross-linking reactions that have been used include free radical reactions, condensation reactions, hydrosilylation addition reactions, and hydrosilane/silanol reactions. Cross-linking may also result from photoinitiated reactions relying on the activation of an intermediate to induce subsequent cross-linking.

Peroxide induced free radical reactions that rely on the availability of C—H bonds present in the methyl side groups provide a non-specific cross-link structure that would not result in the desired network structure. However, the use of siloxanes containing vinyl groups with vinyl specific peroxides could provide the desired structure given the appropriate choice of starting materials. Free radical reactions can also be activated by UV light or other sources of high energy radiation, e.g., electron beams.

The condensation reaction can occur between complementary groups attached to the siloxane backbone. Isocyanate, epoxy, or carboxylic acids condensing with amine or hydroxy functionalities have been used to cross-link siloxanes. More commonly, the condensation reaction relies on the ability of some organic groups attached to silicon to react with water, thus providing silanol groups which further react with either the starting material or other silanol group to produce a cross-link. It is known that many groups attached to silicon are readily hydrolyzable to produce silanol groups. In particular, alkoxy, acyloxy, and oxime groups are known to undergo this reaction. In the absence of moisture, these groups do not react, and therefore, provide a sufficient working life relative to unprotected silanol groups. On exposure to moisture, these groups spontaneously hydrolyze and condense. These systems may be catalyzed as necessary. A subset of these systems is tri- or tetra-functional silanes containing three or four hydrolyzable groups.

Hydrosilane groups can react in a similar manner as described for the condensation reaction. They can react directly with SiOH groups or may first be converted to an OH group by reaction with water before condensing with a second SiOH moiety. The reaction may be catalyzed by either condensation or hydrosilylation catalysts.

The hydrosilylation addition reaction relies on the ability of the hydrosilane bond to add across a carbon-carbon double bond in the presence of a noble metal catalyst. Such reactions are widely used in the synthesis of organofunctional siloxanes and to prepare release liners for pressure sensitive adhesives.

Well known photoinitiated reactions can be adapted to cross-link siloxanes. Organofunctional groups such as cinnamates, acrylates, epoxies, etc., can be attached to the siloxane backbone. Additionally, the photoinitiators may be grafted onto the siloxane backbone for improved solubility. Other examples of this chemistry include addition of a thiol across a carbon carbon double bond (typically, an aromatic ketone initiator is required), hydrosilane/ene addition (the free radical equivalent of the hydrosilylation reaction), acrylate polymerization (can also be electron beam activated), and radiation induced cationic polymerization of epoxides, vinyl ethers, and other functionalities.

Other useful additives for the absorbent layer are expandable particles, both blowable and non-blowable. Non-limiting examples of expandable particles are Expancel™ microspheres (commercially obtained from Expancel, Inc., Duluth, Ga.), Expandable Polystyrene Bead (commercially obtained from StyroChem International, Fort Worth, Tex.), Matsumoto Microsphere™ F series (commercially obtained from Matsumoto Yushi-Seiyaku Co., Ltd., Osaka, Japan), Dualite™ M6050AE (commercially available from Sovereign Specialty Chemicals, Akron, Ohio). The preferred expandable particles are Expancel™ microspheres and Matsumoto Microsphere™ F series micro spheres.

Expancel™ microspheres are small spherical plastic particles. The microspheres consist of a polymer shell encapsulating a gas. When the gas inside the shell is heated, it increases its pressure and the thermoplastic shell softens, resulting in a dramatic increase in the volume of the microspheres. When fully expanded, the volume of the microspheres may increases up to more than 40 times the original dimensions. The product range includes both unexpanded and expanded microspheres. Unexpanded microspheres are used as blowing agents in many areas such as printing inks, paper, textiles, polyurethanes, PVC-plastics and more. The expanded microspheres are used as lightweight fillers in various applications.

Matsumoto Microsphere™ F series are thermo-expandable micro spheres having 10 to 30 microns diameter produced by encapsulating low-boiling-point hydrocarbons with a wall of copolymers of vinylidene chloride, acrylonitrile and the like through in-situ polymerization. They are mixed with various resins and formed into a layer containing separate pores at low temperature for a short time through the steps of coating, impregnating or kneading.

The expandable particles can be mixed with absorbent materials by a variety of conventional mixing techniques including hand stirring, propeller mixing, Cowles mixing or high shear mixing, roller mixing, homogenization, and microfluidization. The weight ratio of expandable particles to absorbing materials ranges from 0.5 to 25%. Preferably, the weight ratio is between 4 and 10%.

The existing absorbing or "drying" process consists of absorbing the excess carrier fluid from the image face, after the image is plated onto the photoreceptor and before the image is transferred to the receiving medium, by means of an absorptive polymer layer coated onto a roll, belt, disk, or sheet. Other methods of carrier fluid removal include: drying the image from the backside of the image using vacuum assistance through a semi-permeable membrane; thermally drying the receiving medium after the image has been transferred, absorbing by the drying member, of excess carrier fluid from a non-absorptive intermediate transfer belt after the image has been transferred to the receiving medium; and thermally evaporating the excess carrier fluid from an absorptive transfer belt and/or the image into the surrounding environment.

Regeneration or "renewing" the drying member is desirable because absorption of carrier fluid by the drying member may be repeated after the carrier has been absorbed and the imaging cycle completed. Regeneration is usually facilitated by heat, pressure, or vacuum or a combination thereof. After regeneration is completed, the drying member is capable of absorbing more carrier fluid because the drying member remains unsaturated with the carrier fluid. The existing process consists of thermal regeneration and is used as such in this invention. In some systems, regeneration occurs after a number of cycles or when a particular concentration of carrier solvent in the member is attained. In other systems, regeneration occurs after each print cycle.

The ink film 28 portion of liquid ink 24, representing the desired image to be printed, is then transferred, either directly to the receiving medium 36 to be printed, or preferably and as illustrated in FIG. 1, indirectly by way of intermediate transfer member 38 and transfer roller 40.

The intermediate transfer member comprises a substrate and at least a polymeric layer. The intermediate transfer member may be of any suitable size and shape such as film, sheet, web, cylinder, drum, endless belt, endless mobius strip, disc, and the like. The preferred shapes of the intermediate transfer member are endless belt, drum, and cylinder. When the intermediate transfer member is in the form of an endless belt, the intermediate transfer member typically has a thickness of from about 25 to 3175 microns, preferably from 75 to 750 microns.

The substrate may be formed from many materials. Non-limiting examples of suitable materials for the substrate include conductive metals such as aluminum, steel, brass, copper, nickel, zinc, chromium, stainless steel, semitransparent aluminum, steel, cadmium, silver, gold, indium, tin, and the like; metal oxides such as tin oxide, indium tin oxide, and others; rubbers such as neoprene, urethane, conductive urethanes butyl rubber, and natural rubber; Viton® sponge material; nitrile sponge material (NBR); thermoplastics such as polyimide, polyester, and polycarbonate; and a combination thereof. Polymers that are crosslinked without rendering them brittle are also acceptable. Optionally, the substrate may comprise conductive or dielectric fillers such as carbon particles, titanium dioxide, barium titanate, and other suitable fillers.

The polymeric layer on the intermediate transfer member comprises at least a polymer. Non-limiting examples of suitable polymers for the polymeric layer include polyethylene, polyesters, polyurethanes, silicones, fluoroelastomers, and fluorosilicones. The preferred polymers for the polymeric layer are fluorosilicones such as 94-003 (commercially available from Dow Corning, Midland, Mich.) and FRV 1106 (commercially available from GE Silicones, Waterford, N.Y.) and silicones such as Silastic™ 732 Adhesive Sealant (commercially available from Dow Corning, Midland, Mich.) RTV 106 (commercially available from GE Silicones, Waterford, N.Y.). The polymeric layer typically has a thickness ranging from 5 to 50 microns, preferably 10 to 30 microns, and more preferably 15 to 20 microns.

Optionally, the polymeric layer comprises at least an additive. Non-limiting examples of suitable additives include coupling agents, curing agents, organic titanates, coloring agents, reinforcing fillers, cross-linking agents, processing aids, accelerators, surfactants, and polymerization initiators.

The preferred additives are organic titanates such as Tyzor™ (alkoxy titanate, commercially available from DuPont Chemicals, Wilmington, Del.), Super TPT™, Super ET™, Super TBT™ (ortho titanate esters, commercially available from Super Urecoat Industries, Ahmedabad, India), and Vertec™ (commercially available from Synetix, Billingham, UK). The typical amount of organic titanate ranges from 0.5 to 10% by weight of the polymeric layer, preferably from 1–5%.

The polymeric layer may be formed, by way of a non-limiting example, by coating on the substrate a polymeric coating composition comprising a suitable polymer, at least an additive such as an organic titanate, and a suitable solvent for both the polymer and the additive. Then the solvent is removed from the polymeric coating composition to form a polymeric layer on the substrate. The coating may be applied on the substrate by any conventional coating method available in the art. Non-limiting examples of suitable coating methods include syringe coating, ring coating, dip coating, web coating, curtain coating, knife coating, and spraying.

When the polymeric coating composition contain fluorosilicones or silicones having hydroxyl group, acetoxy group, or a combination thereof, the polymeric coating composition may comprises optionally at least a monohydroxy organic alcohol. The monohydroxy organic alcohol is used to control the curing rate of the fluorosilicones or silicones. The curing rate should be neither too fast such that the pot life of the polymeric coating composition becomes too short for practical uses, nor too slow such that the curing takes too much time to complete. The curing rate should be between 10 minutes to 6 hours, preferably between 30 minutes and 2 hours. Non-limiting examples of suitable monohydroxyl organic alcohols include methanol, ethanol, propanol, isopropanol, butanol, t-butyl alcohol, and other higher molecular weight analogs. The preferred monohydroxyl organic alcohols are methanol, ethanol, propanol, and isopropanol. The typical amount of monohydroxyl organic alcohol ranges from 0.5 to 10% by weight of the polymeric layer, preferably from 1–8%.

Optionally, the intermediate transfer member comprises at least an intermediate layer which is located between the substrate and the polymeric layer. Non-limiting examples of suitable intermediate layers are a conductive layer and an adhesive layer. The conductive layer is used to adjust the electrical resistivity of the intermediate transfer member. The electrical resistivity of the intermediate transfer member is typically between $1\times10^5$ to $1\times10^{12}$ ohms-cm. The adhesive layer should not be too thick that it interferes with electrical properties of the intermediate transfer member. Non-limiting examples of suitable materials for adhesive layer include SS 4179 (commercially available from GE Silicones, Waterford, N.Y.) and D.C. 1200 (commercially available from Dow Corning, Midland, Mich.). The adhesive layer may be applied by a suitable coating method such as syringe coating, ring coating, dip coating, web coating, knife coating, spraying, and hand brushing.

Typically, heat and pressure are utilized to fuse the image to receiving medium 36. The resultant "print" is a hard copy manifestation of the image information written by laser scanning device 22 and is of a single color, the color represented by liquid ink 24.

Figure 2:
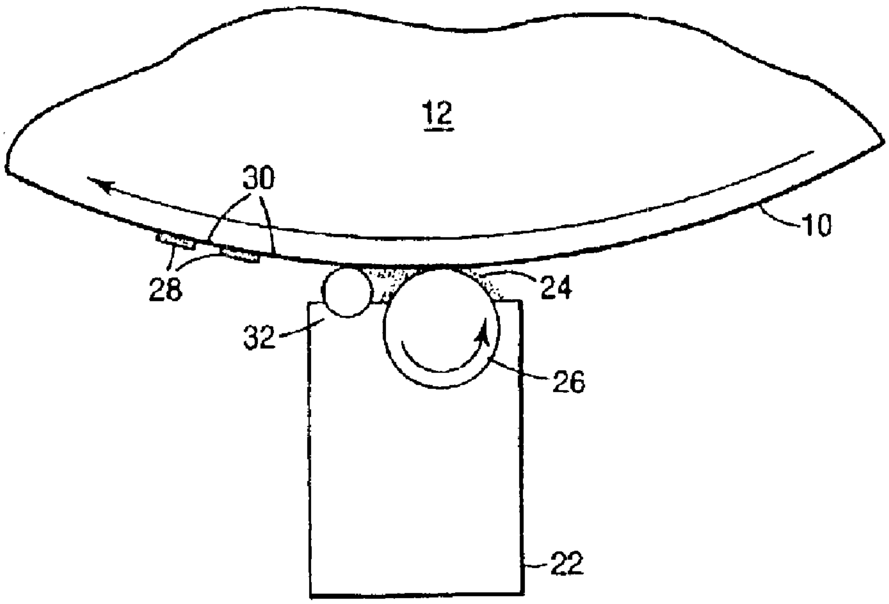
FIG. 2 is a diagrammatic illustration of an alternative basic liquid electrophotographic process in which the present invention has utility and an apparatus for performing that process.

While photoreceptor 10, drum 12, erase lamp 14, charging device 18, laser scanning device 20, liquid ink developer station 22, liquid ink 24, developer roll 26, squeegee 32, drying mechanism 34 and intermediate transfer member 38 and transfer roller 40 have been only diagrammatically illustrated in FIGS. 1 and 2 and only generally described with relation thereto, it is to be recognized and understood that these components are generally well known in the art of electrophotography and the exact material and construction of these elements is a matter of design choice which is also well understood in the art.

It is possible, of course, to make prints containing many colors rather than one single color. The basic liquid electrophotography process and apparatus described in FIGS. 1 and 2 can be used by repeating the process described above for one color, a number of times wherein each repetition may image-wise expose a separate primary color plane, e.g., cyan, magenta, yellow or black, and each liquid ink 24 may be of a separate primary printing color corresponding to the image-wise exposed color plane. Superposition of four such color planes may be achieved with good registration onto the surface of photoreceptor 10 without transferring any of the color planes until all have been formed. Subsequent simultaneous transfer of all of these four color planes to a suitable receiving medium 36 may yield a quality color print.

While the above described liquid electrophotography process is suitable for construction of a multi-colored image, the process is somewhat slow because photoreceptor 10 should repeat the entire sequence for each color of the typical four-color colored image. When the above process is per-formed for a particular color, e.g., cyan, laser scanning device 20 causes areas 20 photoreceptor 10 receiving radiation to at least partially discharged to create a surface charge distribution pattern of the surface of photoreceptor 10 which represents the portion of the image to be reproduced representing that particular color, e.g., cyan. After development by liquid developer station 22, the surface charge distribution of photoreceptor 10 is still quite variable (assuming at least some pattern to the image to be reproduced) and too low to be subsequently imaged. Photoreceptor 10 then should be erased to make the surface charge distribution uniform and should be again charged to provide a sufficient surface charge to allow a subsequent development process to plate liquid ink upon areas 28 of photoreceptor 10.

Figure 3:
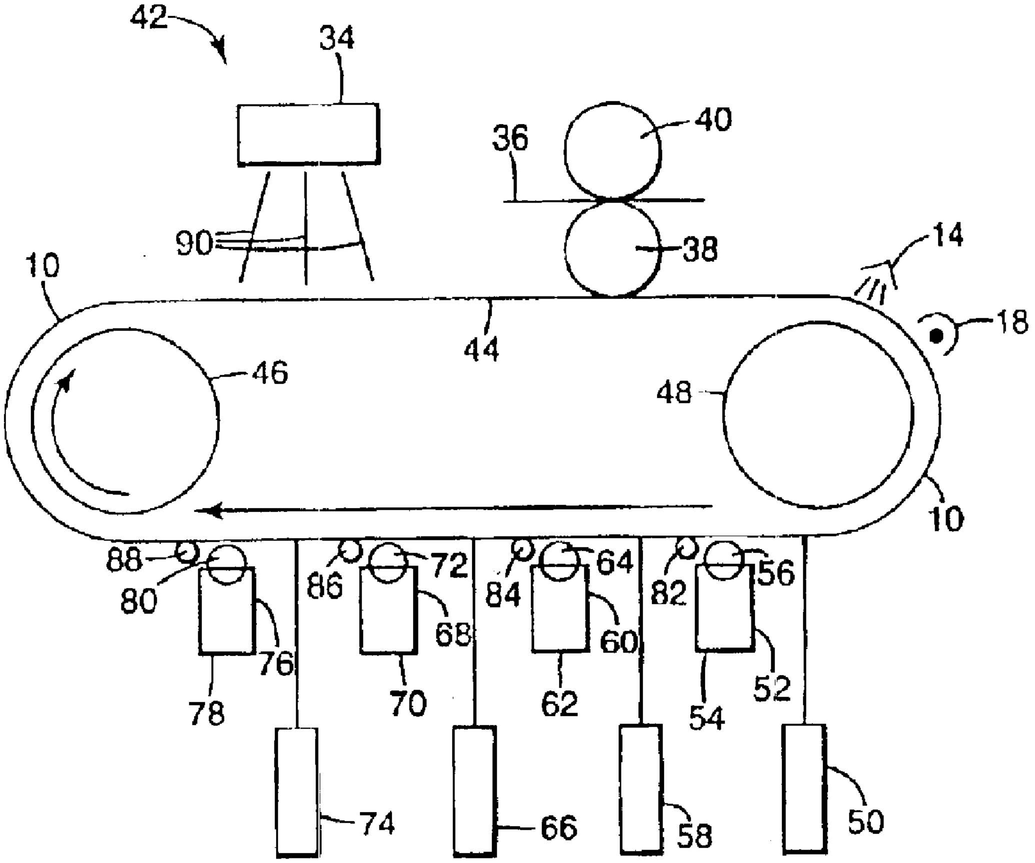
FIG. 3 is a diagrammatic illustration of an apparatus and a method for producing a multi-colored image in accordance with the present invention.

While not required by all embodiments of the present invention, FIG. 3 diagrammatically illustrates an apparatus 42 and a method for producing a multicolored image. Photoreceptor 10 is mechanically supported by belt 44 which rotates in a clockwise direction around rollers 46 and 48. Photoreceptor 10 is first conventionally erased with erase lamp 14. Any residual charge left on photoreceptor 10 after the preceding cycle is preferably removed by erase lamp 14 and then conventionally charged using charging device 18, such procedures being well known in the art. When so charged, the surface of photoreceptor 10 is uniformly charged to what is typically with today's technology around positive (or negative) 600 volts. Laser scanning device 50, similar to laser scanning device 20 illustrated in FIG. 1, exposes the surface of photoreceptor 10 to radiation in an image-wise pattern corresponding to a first color plane of the image to be reproduced.

With the surface of photoreceptor so image-wise charged, charged pigment particles in liquid ink 52 corresponding to the first color plane will migrate to and plate upon the surface of photoreceptor 10 in areas where the surface voltage of photoreceptor 10 is less than the bias of developer roll 56 associated with liquid ink developer station 54. The charge neutrality of liquid ink 52 is maintained by negatively (or positively) charged counter ions which balance the positively (or negatively) charged pigment particles. Counter ions are deposited on the surface of photoreceptor 10 in areas where the surface voltage is greater than the bias voltage of developer roll 56 associated with liquid ink developer station 54.

At this stage, photoreceptor 10 contains on its surface an image-wise distribution of plated "solids" of liquid ink 52 in accordance with a first color plane. The surface charge distribution of photoreceptor 10 has also been recharged with plated ink particles as well as with transparent counter ions from liquid ink 52 both being governed by the image-wise discharge of photoreceptor 10 due to laser scanning device 50. Thus, at this stage the surface charge of photoreceptor 10 is also quite uniform. Although not all of the original surface charge of photoreceptor may have been obtained, a substantial portion of the previous surface charge of photoreceptor has been recaptured. With such solution recharging, photoreceptor 10 is now ready to be processed for the next color plane of the image to be reproduced.

As belt 44 continues to rotate, photoreceptor 10 next is image-wise exposed to radiation from laser scanning device 58 corresponding to a second color plane. Note that this process occurs during a single revolution of photoreceptor 10 by belt 44 and without the necessity of photoreceptor 10 being subjected to an erase step subsequent to exposure to laser scanning device 50 and liquid ink development station 54 corresponding to a first color plane. The remaining charge on the surface of photoreceptor 10 is exposed to radiation corresponding to a second color plane. This produces an image-wise distribution of surface charge (a second latent image) on photoreceptor 10 corresponding to the second color plane of the image.

The second color plane of the image is then developed by developer station 60 containing liquid ink 60. Although liquid ink 62 contains "solid" color pigments consistent with the second color plane, liquid ink 62 also contains substantially transparent counter ions which, although they may have differing chemical compositions than substantially transparent counter ions of liquid ink 52, still are substantially transparent and oppositely charged to the "solid" color pigments. Developer roll 64 provides a bias voltage to allow "solid" color pigments of liquid ink 62 create a pattern of "solid" color pigments on the surface of photoreceptor 10 corresponding to the second color plane. The transparent counter ions also substantially recharge photoreceptor 10 and make the surface charge distribution of photoreceptor 10 substantially uniform so that another color plane may be placed upon photoreceptor 10 without the necessity of an electrical erase step or corona charging.

A third color plane of the image to be reproduced is deposited on the surface of photoreceptor 10 is similar fashion using laser scanning device 64 and developer station 70 containing liquid ink 68 using developer roll 72. Again, the surface charge existing on photoreceptor 10 following development of the third color plane may be somewhat less than existed prior to exposure to laser scanning device 66 but will be substantially "recharged" and will be quite uniform allowing application of the fourth color plane without the necessity of an erase step or corona charging.

Similarly, a fourth color plane is deposited upon photoreceptor 10 using laser scanning device 74 and developer station 78 containing liquid ink 76 using developer roll 80.

Preferably, excess liquid from liquid inks 52, 60, 68 or 76 is "squeezed" off using a roller similar to roller 32 described with respect to FIG. 1. Such a roller may be used in conjunction with any of developer stations 54, 62, 70 and 78 or all of them.

The plated solids from liquid inks 52, 60, 68 and 76 are dried in a drying mechanism 34 similar to that described with respect to FIG. 1. Drying mechanism 34 may be passive, may utilize active air blowers or may be other active devices such as drying rollers, vacuum devices, coronas, etc.

The completed four color image is then transferred, either directly to the receiving medium 36 to be printed, or preferably and as illustrated in FIG. 3, indirectly by way of intermediate transfer member 38 and transfer roller 40. Typically, heat and/or pressure are utilized to fix the image to receiving medium 36. The resultant "print" is a hard copy manifestation of the four color image.

With proper selection of charging voltages, photoreceptor capacity and liquid ink, this process may be repeated an indeterminate number of times to produce a multi-colored image having an indeterminate number of color planes. Although the process and apparatus has been described above for conventional four color images, the process and apparatus are suitable for multi-color images having two or more color planes.

One type of ink found particularly suitable for use as liquid inks 52, 60, 68 and 76 consists of ink materials that are substantially transparent and of low absorptivity to radiation from laser scanning devices 50, 58, 66 and 74. This allows radiation from laser scanning devices 50, 58, 66 and 74 to pass through the previously deposited ink or inks and impinge on the surface of photoreceptor 10 and reduce the deposited charge. This type of ink permits subsequent imaging to be effected through previously developed ink images as when forming a second, third, or fourth color plane without consideration for the order of color deposition. It is preferable that the inks transmit at least 80% and more preferably 90% of radiation from laser scanning devices 50, 58, 66 and 74 and that the radiation is not significantly scattered by the deposited ink material of liquid inks 52, 60, 68 and 76.

One type of ink found particularly suitable for use as liquid inks 52, 60, 68 and 76 are organosols which exhibit excellent imaging characteristics in liquid immersion development. For example, the organosol liquid inks exhibit low bulk conductivity, low free phase conductivity, low charge/mass and adequate mobility, all desirable characteristics for producing high resolution, background free images with high optical density. In particular, the low bulk conductivity, low free phase conductivity and low charge/mass of the inks allow them to achieve high developed optical density over a wide range of solids concentrations, thus improving their extended printing performance relative to conventional inks.

On development, these color liquid inks form colored films which transmit incident radiation, consequently allowing the photoconductor layer to discharge upon imagewise exposure to radiation from the imaging radiation sources, while non-coalescent particles scatter a portion of the incident light. Non-coalesced ink particles therefore result in the decreasing of the sensitivity of the photoconductor to subsequent exposures and consequently there is interference with the overprinted image.

These inks may have low Tg values which enable the inks to form films at room temperature. Normal room temperature (19°–20° C.) is sufficient to enable film forming. The ambient internal temperatures of the apparatus during operation tend to be at a higher temperature (e.g., 25°–40° C.), even without specific heating elements. Both the normal room temperature and the ambient internal temperatures are sufficient to cause the ink or allow the ink to form a film.

The carrier liquid may be selected from a wide variety of materials which are well known in the art. The carrier liquid is typically oleophilic, chemically stable under a variety of conditions, and electrically insulating. "Electrically insulating" means that the carrier liquid has a low dielectric constant and a high electrical resistivity. Preferably, the carrier liquid has a dielectric constant of less than 5, and still more preferably less than 3. Examples of suitable carrier liquids are aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons and the like), silicone oils and blends of these solvents. Preferred carrier liquids include paraffinic solvent blends sold under the names Isopar® G liquid, Isopar® H liquid, Isopar® K liquid and Isopar® L liquid (manufactured by Exxon Chemical Corporation, Houston, Tex.). The preferred carrier liquid is Norpar® 12 liquid, also available from Exxon Corporation.

The ink particles are comprised of colorant embedded in a thermoplastic resin. The colorant may be a dye or more preferably a pigment. The resin may be comprised of one or more polymers or copolymers which are characterized as being generally insoluble or only slightly soluble in the carrier liquid; these polymers or copolymers comprise a resin core. In addition, superior stability of the dispersed ink particles with respect to aggregation is obtained when at least one of the polymers or copolymers (denoted as the stabilizer) is an amphipathic substance containing at least one chain-like component of molecular weight at least 500 which is solvated by the carrier liquid. Under such conditions, the stabilizer extends from the resin core into the carrier liquid, acting as a steric stabilizer as discussed in *Dispersion Polymerization* (Ed. Barrett, Interscience., p. 9 (1975). Preferably, the stabilizer is chemically incorporated into the resin core, i.e., covalently bonded or grafted to the core, but may alternatively be physically or chemically adsorbed to the core such that it remains as an integral part of the resin core.

The composition of the resin is preferentially manipulated such that the organosol exhibits an effective glass transition temperature (Tg) of less than 25° C. (more preferably less than 6° C.), thus causing an ink composition of liquid inks 52, 60, 68 and 76 containing the resin as a major component to undergo rapid film formation (rapid self fixing) in printing or imaging processes carried out at temperatures greater than the core Tg (preferably at or above 25° C.). The use of low Tg resins to promote rapid self fixing of printed or toned images is known in the art, as exemplified by "Film Formation" (Z. W. Wicks, Federation of Societies for Coatings Technologies, p. 8 (1986). Rapid self-fixing is thought to avoid printing defects (such as smearing or trailing-edge tailing) and incomplete transfer in high speed printing. For printing on plain paper, it is preferred that the core Tg be greater than minus 10° C. and, more preferably, be in the range from −5° C. to +5° C. so that the final image is not tacky and has good block resistance.

Such rapid self fixing is desired of liquid inks 52, 60 and 68 to enable such liquid inks 52, 60 and 68 to film form before being subjected to overlay by a subsequent liquid ink 60, 68 and 76 in the formation of a subsequent color plane of the image. It is preferred that liquid inks 52, 60, 68 and 76 self fix within 0.5 seconds to enable the apparatus to operate at sufficient speed and to ensure image quality. It is generally believed that such rapid self-fixing will occur in liquid inks 52, 60, 68 and 76 which have greater than 75 percent volume fraction of solids in the image.

It is also preferred that the glass transition temperature (Tg) of liquid inks 52, 60, 68 and 76 be greater than −10° C. and less than +25° C. so that the final image is not tacky and has good block resistance. More preferred is a Tg between −5° C. and +5° C.

It is also preferred that liquid inks 52, 60, 68 and 76 have a low charge to mass ratio which assists in giving the resultant image high density. It is preferred that liquid inks 52, 60, 68 and 76 have a charge to mass ratio of from 10–1000 microcoulombs/g in the most preferred embodiment.

It is also preferred that liquid inks 52, 60, 68 and 76 have a low free phase conductivity which aids in providing high resolution, gives good sharpness and low background. It is preferred that liquid inks 52, 60, 68 and 76 have a free phase conductivity of less than 30 percent at 1 percent solids. It is still more preferred that liquid inks 52, 60, 68 and 76 have a free phase conductivity of less than 20 percent at 1 percent solids. A free phase conductivity of less than 10 percent at 1 percent solids is most preferred for liquid inks 52, 60, 68 and 76.

Examples of resin materials suitable for use in liquid inks 52, 60, 68 and 76 include polymers and copolymers of (meth)acrylic esters; including methyl acrylate, ethyl acrylate, butyl acrylate, ethylhexyl acrylate, 2-ethylhexylmethacrylate, lauryl acrylate, octadecyl acrylate, methyl methacrylate, ethyl methacrylate, lauryl methacrylate, 2-hydroxy ethyl methacrylate, octadecyl methacrylate, 3,3,5-trimethylcyclohexyl methacrylate, dimethylaminoethyl methacrylate, diethylaminoethyl methacrylate, isobornyl acrylate, and other polyacrylates and polymethacrylates. Other polymers may be used in conjunction with the aforementioned materials, including melamine and melamine formaldehyde resins, phenol formaldehyde resins, epoxy resins, polyester resins, styrene and styrene/acrylic copolymers, acrylic and methacrylic esters, cellulose acetate and cellulose acetate-butyrate copolymers, and poly(vinyl butyral) copolymers.

The colorants which may be used in liquid inks 52, 60, 68 and 76 include virtually any dyes, stains or pigments which may be incorporated into the polymer resin, which are compatible with the carrier liquid, and which are useful and effective in making visible the latent electrostatic image. Examples of suitable colorants include: Phthalocyanine blue (C.I. Pigment Blue 15 and 16), Quinacridone magenta (C.I. Pigment Red 122, 192, 202 and 206), Rhodamine YS (C.I. Pigment Red 81), diarylide (benzidine) yellow (C.I. Pigment Yellow 12, 13, 14, 17, 55, 83 and 155) and arylamide (Hansa) yellow (C.I. Pigment Yellow 1, 3, 10, 73, 74, 97, 105 and 111); organic dyes, and black materials such as finely divided carbon and the like.

The optimal weight ratio of resin to colorant in the ink particles is on the order of 1/1 to 20/1, most preferably between 10/1 and 3/1. The total dispersed "solid" material in the carrier liquid typically represents 0.5 to 20 weight percent, most preferably between 0.5 and 3 weight percent of the total liquid developer composition.

Liquid inks 52, 60, 68 and 76 include a soluble charge control agent, sometimes referred to as a charge director, to provide uniform charge polarity of the ink particles. The charge director may be incorporated into the ink particles, may be chemically reacted to the ink particle, may be chemically or physically adsorbed onto the ink particle (resin or pigment), and may be chelated to a functional group incorporated into the ink particle, preferably via a functional group comprising the stabilizer. The charge director acts to impart an electrical charge of selected polarity (either positive or negative) to the ink particles. Any number of charge directors described in the art may be used herein; preferred positive charge directors are the metallic soaps. The preferred charge directors are polyvalent metal soaps of zirconium and aluminum, preferably zirconium octoate.

Charging device 18 is preferably a scorotron type corona charging device. Charging device 18 has high voltage wires (not shown) coupled to a suitable positive high voltage source of plus 4,000 to plus 8,000 volts. The grid wires of charging device 18 are disposed from about 1 to about 3 millimeters from the surface of photoreceptor 10 and are coupled to an adjustable positive voltage supply (not shown) to obtain an apparent surface voltage on photoreceptor 10 in the range plus 600 volts to plus 1000 volts or more depending upon the capacitance of photoreceptor. While this is the preferred voltage range, other voltages may be used. For example, thicker photoreceptors typically require higher voltages. The voltage required depends principally on the capacitance of photoreceptor 10 and the charge to mass ratio of the liquid ink utilized as the ink for apparatus 42. Of course, connection to a positive voltage is required for a positive charging photoreceptor 10. Alternatively, a negatively charging photoreceptor 10 using negative voltages would also be operable. The principles are the same for a negative charging photoreceptor 10.

Laser scanning device 50 imparts image information associated with a first color plane of the image, laser scanning device 58 imparts image information associated with a second color plane of the image, laser scanning device 66 imparts image information associated with a third color plane of the image and laser scanning device 74 imparts image information associated with a fourth color plane of the image. Although each of laser scanning devices 50, 58, 66 and 74 are associated with a separate color of the image and operate in the sequence as described above with reference to FIG. 3, for convenience they are described together below.

Laser scanning devices 50, 58, 66 and 74 include a suitable source of high intensity electromagnetic radiation. The radiation may be a single beam or an array of beams. The individual beams in such an array may be individually modulated. The radiation impinges, for example, on photoreceptor 10 as a line scan generally perpendicular to the direction of movement of photoreceptor 10 and at a fixed position relative to charging device 18.

The radiation scans and exposes photoreceptor 10, preferably while maintaining exact synchronism with the movement of photoreceptor 10. The image-wise exposure causes the surface charge of photoreceptor 10 to be reduced significantly wherever the radiation impinges. Areas of the surface of photoreceptor 10 where the radiation does not impinge are not appreciably discharged. Therefore, when photoreceptor 10 exits from under the radiation, its surface charge distribution is proportional to the desired image information.

The wavelength of the radiation to be transmitted by laser scanning devices 50, 58 and 66 is selected to have low absorption through the first three color planes of the image. The fourth image plane is typically black. Black is highly absorptive to radiation of all wavelengths which would be useful in the discharge of photoreceptor 10. Additionally, the wavelength of the radiation of laser scanning devices 50, 58, 66 and 74 selected should preferably correspond to the maximum sensitivity wavelength of photoreceptor 10. Preferred sources for laser scanning devices 50, 58, 66 and 74 are infrared diode lasers and light emitting diodes with emission wavelengths longer than 700 nanometers. Specially selected wavelengths in the visible may also be usable with some combinations of colorants. The preferred wavelength is between 750 and 850 nanometers, between 760 and 820 nanometers, between 770 and 800 nanometers, and approximately about 780 nanometers.

The radiation (in this instance, a single beam or array of beams) from laser scanning devices 50, 58, 66 and 74 is modulated conventionally in response to image signals for any single color plane information from a suitable source such as a computer memory, communication channel, or the like. The mechanism through which the radiation from laser scanning devices is manipulated to reach photoreceptor 10 is also conventional.

The radiation strikes a suitable scanning element such as a rotating polygonal mirror (not shown) and then passes through a suitable scan lens (not shown) to focus the radiation at a specific raster line position with respect to photoreceptor 10. It will of course be appreciated that other scanning means such as an oscillating mirror, modulated fiber optic array, waveguide array, or suitable image delivery system may be used in place of or in addition to a polygonal mirror. For digital halftone imaging, it is preferred that radiation should be able to be focused to diameters of less than 50 microns and preferably less than 42 microns at the one-half maximum intensity level assuming a resolution of 600 dots per inch. A lower resolution may be acceptable for some applications. It is preferred that the scan lens should be able to maintain this beam diameter across at least a 12 inches (30.5 centimeters) width.

The polygonal mirror typically is rotated conventionally at constant speed by controlling electronics which may include a hysteresis motor and oscillator system or a servo feedback system to monitor and control the scan rate. Photoreceptor 10 is moved orthogonal to the scan direction at constant velocity by a motor and position/velocity sensing devices past a raster line where radiation impinges upon photoreceptor 10. The ratio between the scan rate produced by the polygonal mirror and photoreceptor 10 movement speed is maintained constant and selected to obtain the required addressability of laser modulated information and overlap of raster lines for the correct aspect ratio of the final image. For high quality imaging, it is preferred that the polygonal mirror rotation and photoreceptor 10 speed are set so that at least 600 scans per inch, and still more preferably 1200 scans per inch, are imaged on photoreceptor 10.

Developer station 54 develops the first color plane of the image, developer station 62 develops the second color plane of the image, developer station 70 develops the third color plane of the image and developer station 78 develops the fourth color plane of the image. Although each of developer stations 54, 62, 70 and 78 are associated with a separate color of the image and operate in the sequence as described above with reference to FIG. 3, for convenience they are described together below.

Conventional liquid ink immersion development techniques are used in developer stations 54, 62, 70 and 78. Two general modes of development are known in the art, namely deposition of liquid inks 52, 60, 68 and 76 in exposed areas of photoreceptor 10 and, alternatively, deposition of liquid inks 52, 60, 68 and 76 in unexposed regions. The former mode of imaging can improve formation of halftone dots while maintaining uniform density and low background densities. Although the invention has been described using a discharge development system whereby the positively charged liquid inks 52, 60, 68 and 76 is deposited on the surface of photoreceptor 10 in areas discharged by the radiation, it is to be recognized and understood that an imaging system in which the opposite is true is also contemplated by this invention. Development is accomplished by using a uniform electric field produced by developer rolls 56, 64, 72 and 80 spaced near the surface of photoreceptor 10.

Developer stations 54, 62, 70 and 78 consist of developer rolls 56, 64, 72 and 80, squeegee rollers 82, 84, 86 and 88, fluid delivery system, and a fluid return system. A thin, uniform layer of liquid inks 52, 60, 68 and 76 is established on a rotating, cylindrical developer rolls 56, 64, 72 and 80. A bias voltage is applied to the developer roll intermediate to the unexposed surface potential of photoreceptor 10 and the exposed surface potential level of photoreceptor 10. The voltage is adjusted to obtain the required maximum density level and tone reproduction scale for halftone dots without any background being deposited. Developer rolls 56, 64, 72 and 80 are brought into proximity with the surface of photoreceptor 10 immediately before the latent image formed on the surface of photoreceptor 10 passes beneath developer rolls 56, 64, 72 and 80. The bias voltage on developer rolls 56, 64, 72 and 80 forces the charged pigment particles, which are mobile in the electric field, to develop the latent image. The charged "solid" particles in liquid inks 52, 60, 68 and 76 will migrate to and plate upon the surface of photoreceptor 10 in areas where the surface charge of photoreceptor 10 is less than the bias voltage of developer rolls 56, 64, 72 and 80. The charge neutrality of liquid inks 52, 60, 68 and 76 is maintained by oppositely-charged substantially transparent counter ions which balance the charge of the positively charged ink particles. Counter ions are deposited on the surface photoreceptor 10 in areas where the surface voltage of photoreceptor 10 is greater than the developer roll bias voltage.

After plating is accomplished by developer rolls 56, 64, 72 and 80, squeegee rollers 82, 84, 86 and 88 then rolls over the developed image area on photoreceptor 10 removing the excess liquid inks 52, 60, 68 and 76 and successively leaving behind each developed color plane of the image. A bias voltage can be applied to the squeegee rollers 82, 84, 86 and 88 to prevent plating on them, especially when the resistivity of the squeegee roller is lower than $1\times10^{10}$ ohm/square, preferably lower than $1\times10^{9}$ ohm/square. Alternatively, sufficient excess liquid ink remaining on the surface of photoreceptor 10 could be removed in order to effect film formation by vacuum techniques well known in the art. The ink deposited onto photoreceptor 10 should be rendered relatively firm (film-formed) by developer rolls 56, 64, 72 and 80, squeegee rollers 82, 84, 86 and 88 or an alternative drying technique in order to prevent it from being washed off in a subsequent developing process(es) by developer stations 62, 70 and 78.

The photoreceptor includes an electrically conductive substrate and a photoconductive element in the form of a single layer that includes both a charge transport compound and a charge generating compound in a polymeric binder. Preferably, however, the photoreceptor includes an electrically conductive substrate and a photoconductive element that is a bilayer construction featuring a charge generating layer and a separate charge transport layer. The charge generating layer may be located intermediate the electrically conductive substrate and the charge transport layer. Alternatively, the photoconductive element may be an inverted construction in which the charge transport layer is intermediate the electrically conductive substrate and the charge generating layer.

The electrically conductive substrate may be flexible, for example in the form of a flexible web or a belt, or inflexible, for example in the form of a drum. Typically, a flexible electrically conductive substrate comprises of an insulated substrate and a thin layer of an electrically conductive material. The insulated substrate may be paper or a film forming polymer such as a polyester such as polyethylene terephthalate and polyethylene naphthalate, polyimide, polysulfone, polyamide, polycarbonate, vinyl resins such as polyvinyl fluoride and polystyrene, and the like. Specific examples of supporting substrates included polyethersulfone (Stabar® S-100, commercially available from ICI), polyvinyl fluoride (Tedlar®, commercially available from E.I. DuPont de Nemours & Company), polybisphenol-A polycarbonate (Makrofol®, commercially available from Mobay Chemical Company) and amorphous polyethylene terephthalate (Melinar®, commercially available from ICI Americas, Inc. and Dupont A and Dupont 442, commercially available from E.I. DuPont de Nemours & Company).

The electrically conductive material may be graphite, carbon black, iodide, conductive polymers such as polypyroles and Calgon® Conductive polymer 261 (commercially available from Calgon Corporation, Inc., Pittsburgh, Pa.), metals such as aluminum, titanium, chromium, brass, gold, copper, palladium, nickel, or stainless steel, or metal oxide such as tin oxide or indium oxide. Preferably, the electrically conductive material is aluminum or indium tin oxide. Typically, the insulated substrate will have a thickness adequate to provide the required mechanical stability. For example, flexible web substrates generally have a thickness from about 0.01 to about 1 mm, while drum substrates generally have a thickness of from about 0.5 mm to about 2 mm.

The charge generating compound is a material which is capable of absorbing light to generate charge carriers, such as a dyestuff or pigment. Examples of suitable charge generating compounds include metal-free phthalocyanines, metal phthalocyanines such as titanium phthalocyanine, copper phthalocyanine, oxytitanium phthalocyanine (also referred to as titanyl oxyphthalocyanine), hydroxygallium phthalocyanine, squarylium dyes and pigments, hydroxy-substituted squarylium pigments, perylimides, polynuclear quinones available from Allied Chemical Corporation under the tradename Indofast® Double Scarlet, Indofast® Violet Lake B, Indofast® Brilliant Scarlet and Indofast® Orange, quinacridones available from DuPont under the tradename Monastral® Red, Monastral® Violet and Monastral® Red Y, naphthalene 1,4,5,8-tetracarboxylic acid derived pigments including the perinones, tetrabenzoporphyrins and tetranaphthaloporphyrins, indigo- and thioindigo dyes, benzothioxanthene-derivatives, perylene 3,4,9,10-tetracarboxylic acid derived pigments, polyazo-pigments including bisazo-, trisazo- and tetrakisazo-pigments, polymethine dyes, dyes containing quinazoline groups, tertiary amines, amorphous selenium, selenium alloys such as selenium-tellurium, selenium-tellurium-arsenic and selenium-arsenic, cadmium sulfoselenide, cadmiumselenide, cadmium sulfide, and mixtures thereof. Preferably, the charge generating compound is oxytitanium phthalocyanine, hydroxygallium phthalocyanine or a combination thereof.

Preferably, the charge generation layer comprises a binder in an amount of from about 10 to about 90 weight percent and more preferably in an amount of from about 20 to about 75 weight percent, based on the weight of the charge generation layer.

There are many kinds of charge transport materials available for electrophotography. Suitable charge transport materials for use in the charge transport layer include, but are not limited to, pyrazoline derivatives, fluorine derivatives, oxadiazole derivatives, stilbene derivatives, hydrazone derivatives, carbazole hydrazone derivatives, triaryl amines, polyvinyl carbazole, polyvinyl pyrene, or polyacenaphthylene.

The charge transport layer typically comprises a charge transport material in an amount of from about 25 to about 60 weight percent, based on the weight of the charge transport layer, and more preferably in an amount of from about 35 to about 50 weight percent, based on the weight of the charge transport layer, with the remainder of the charge transport layer comprising the binder, and optionally any conventional additives. The charge transport layer will typically have a thickness of from about 10 to about 40 microns and may be formed in accordance with any conventional technique known in the art.

Conveniently, the charge transport layer may be formed by dispersing or dissolving the charge transport material and a polymeric binder in organic solvent, coating the dispersion and/or solution on the respective underlying layer and hardening (e.g., curing, polymerizing or drying) the coating. Likewise, the charge generation layer may be formed by dissolving or dispersing the charge generation compound and the polymeric binders in organic solvent, coating the solution or dispersion on the respective underlying layer and hardening (e.g., curing, polymerizing or drying) the coating.

The binder is capable of dispersing or dissolving the charge transport compound (in the case of the charge transport layer) and the charge generating compound (in the case of the charge generating layer). Examples of suitable binders for both the charge generating layer and charge transport layer include polystyrene-co-butadiene, modified acrylic polymers, polyvinyl acetate, styrene-alkyl resins, soya-alkyl resins, polyvinylchloride, polyvinylidene chloride, polyacrylonitrile, polycarbonates, polyacrylic acid, polyacrylates, polymethacrylates, styrene polymers, polyvinyl butyral, alkyl resins, polyamides, polyurethanes, polyesters, polysulfones, polyethers, polyketones, phenoxy resins, epoxy resins, silicone resins, polysiloxanes, poly(hydroxyether) resins, polyhydroxystyrene resins, novolak resins, resol resins, poly(phenylglycidyl ether)-co-dicyclopentadiene, copolymers of monomers used in the above-mentioned polymers, and combinations thereof. Polycarbonate binders are particularly preferred for the charge transport layer, whereas polyvinyl butyral and polyester binders are particularly preferred for the charge generating layer. Examples of suitable polycarbonate binders for the charge transport layer include polycarbonate A which is derived from bisphenol-A, polycarbonate Z, which is derived from cyclohexylidene bisphenol, polycarbonate C, which is derived from methylbisphenol A, and polyestercarbonates.

The photoreceptor may include additional layers as well. Such layers are well-known and include, for example, barrier layer, release layer, adhesive layer, ground stripe, and sub-layer. The release layer forms the uppermost layer of the photoconductor element with the barrier layer sandwiched between the release layer and the photoconductive element. The adhesive layer locates and improves the adhesion between the barrier layer and the release layer. The sub-layer is a charge blocking layer and is located between the electrically conductive substrate and the photoconductive element. The sub-layer may also improve the adhesion between the electrically conductive substrate and the photoconductive element.

Suitable barrier layers include coatings such as crosslinkable siloxanol-colloidal silica coating and hydroxylated silsesquioxane-colloidal silica coating, and organic binders such as polyvinyl alcohol, methyl vinyl ether/maleic anhydride copolymer, casein, polyvinyl pyrrolidone, polyacrylic acid, gelatin, starch, polyurethanes, polyimides, polyesters, polyamides, polyvinyl acetate, polyvinyl chloride, polyvinylidene chloride, polycarbonates, polyvinyl butyral, polyvinyl acetals such as acetoacetals and polyvinyl formal and polyvinyl butyral, polyacrylonitrile, polymethyl methacrylate, polyacrylates, polyvinyl carbazoles, copolymers of monomers used in the above-mentioned polymers, vinyl resins such as vinyl chloride/vinyl acetate/vinyl alcohol terpolymers, vinyl chloride/vinyl acetate/maleic acid terpolymers, ethylene/vinyl acetate copolymers, vinyl chloride/vinylidene chloride copolymers, cellulose polymers, and mixtures thereof. The above organic binders optionally may contain small inorganic particles such as fumed silica, silica, titania, alumina, zirconia, or a combination thereof. The typical particle size is in the range of 0.001 to 0.5 micrometers, preferably 0.005 micrometers. A preferred barrier layer is a 1:1 mixture of methyl cellulose and methyl vinyl ether/maleic anhydride copolymer with glyoxal as a cross-linker.

The release layer topcoat may comprise any release layer composition known in the art. Preferably, the release layer is a fluorinated polymer, siloxane polymer, fluorosilicone polymer, silane, polyethylene, polypropylene, or a combination thereof. More preferably, the release layers comprise cross-linked silicone polymers.

Typical adhesive layers include film forming polymers such as polyester, polyvinylbutyral, polyvinylpyrolidone, polyurethane, polymethyl methacrylate, poly(hydroxy amino ether) and the like. Preferably, the adhesive layer comprises poly(hydroxy amino ether). If such layers are utilized, they preferably have a dry thickness between about 0.01 micrometer and about 5 micrometers.

Typical sub-layers include polyvinylbutyral, organosilanes, hydrolyzable silanes, epoxy resins, polyesters, polyamides, polyurethanes, silicones and the like. Preferably, the sub-layer has a dry thickness between about 20 Angstroms and about 2,000 Angstroms.

Typical electrically conductive ground stripe contains conductive particles, inorganic particle, a binder, and other additives. Preferably, the surface resistivity of the ground stripe is less than about $1\times10^4$ ohms per square.

Optional conventional additives, such as, for example, surfactants, fillers, coupling agents, fibers, lubricants, wetting agents, pigments, dyes, plasticizers, release agents, suspending agents, and curing agents, may be included in the polymeric layer for the intermediate transfer member of the present invention.

The invention will now be described further by way of the following examples.

EXAMPLES

Comparative Example A

Ten grams of FRV 1106 fluorosilicone prepolymer, which is supplied as 100% solids and has flow characteristics of a semisolid, (commercially obtained from General Electric, Waterford, N.Y.) was placed in a clean, dry 226 ml jar. Ninety grams of methyl ethyl ketone (commercially obtained from Aldrich Chemicals, Milwaukee, Wis.) was then added. The mixture was then placed on a lab shaker (Catalog no. 6010, commercially obtained from Eberbach Corp., Ann Arbor, Mich.) on the "high" setting for 25 minutes. A solution of FRV 1106 fluorosilcone prepolymer was obtained. The solution was then coated onto a 30.48 cm×60.96 cm brass sheet of 0.254 mm thick, (catalog #8956K11, commercially obtained from McMaster-Carr, Chicago, Ill.), using a #16 Meier rod. The coating was dried in air for 2 minutes and then cured in an oven for 3 minutes at 150° C. The coating was then checked for cure by rubbing with an eraser and found to have a greasy texture, indicating an incomplete cure. The dried coating was easily rubbed off from the substrate.

Example 1

Four grams of FRV 1106 fluorosilicone prepolymer was added to a clean, dry, 113 ml jar. 16 grams of methyl ethyl ketone was poured into the jar. The jar was closed and then placed on a lab shaker on the "high" setting for 30 minutes. A solution of FRV 1106 fluorosilicone prepolymer was obtained. Then 0.07 gram of the Tyzor™ TBT (tributyl titanate, commercially obtained from DuPont Chemicals, Wilmington, Del.) was added to the FRV 1106 solution. The mixture was then placed on a lab shaker on the "high" setting for 25 minutes. The resulted coating solution was allowed to sit for 15 minutes, and then coated onto a brass sheet and cured as in Comparative Example A. The resulted dry coating was then checked for cure as in Comparative Example A and found to have formed a resilient semi-rigid elastomer. The dried coating did not delaminate from the brass sheet when rubbed with a pencil eraser, indicating a good cure of the coating.

Example 2

Ten grams of FRV 1106 fluorosilicone prepolymer (commercially obtained from General Electric, Waterford, N.Y.) was placed in a clean, dry 226 ml jar. Ninety grams of methyl ethyl ketone (commercially obtained from Aldrich Chemicals, Milwaukee, Wis.) was then added. The mixture was then placed on a lab shaker (Catalog no. 6010, commercially obtained from Eberbach Corp., Ann Arbor, Mich.) on the "high" setting for 25 minutes. A solution of FRV 1106 fluorosilicone prepolymer was obtained.

Ten grams of Tyzor™ TBT was added to another clean, dry 226 ml jar. Ninety grams of 2-propanol (commercially obtained from Aldrich Chemicals, Ann Arbor, Mich.) was added to the jar. The solution was then placed on a lab mixer on the "high" setting for 25 minutes.

One gram of the Tyzor™ TBT solution in 2-propanol was then added to the FRV 1106 fluorosilicone prepolymer solution. The mixture was then placed on a lab shaker on the "high" setting for 25 minutes. The resulted coating solution was allowed to sit for 15 minutes, and then coated onto a brass sheet and cured as in Comparative Example A. The dried coating was then checked for cure as in Comparative Example A and found to have formed a durable elastomeric coating. The dried coating did not delaminate from the brass sheet when rubbed with a pencil eraser, indicating a good cure of the coating.

Example 3

The coating solution used in example 2 was knife-coated to yield a 51 microns dry film on a 0.0762 mm thick polyester (Melinex® 442, commercially obtained from ICI Films, Wilmington, Del.). The degree of cure of the coating was similar to Example 1 when measured by rubbing with an eraser and found to have cured to a durable elastomer.

Example 4

Seventy grams of methyl ethyl ketone was added to 30 grams of the coating solution used for Examples 1 and 2. The mixture was placed on a lab shaker on the "high" setting for 20 minutes. The resulted solution was allowed to stand for 15 minutes. Then the solution was sprayed by a small automotive paint sprayer (Preval™, 56 ml, commercially obtained from Precision Valve Corporation, Yonkers, N.Y.) onto a rotating transfer roll comprising a conductive rubber layer, having a volume resistivity of $1\times10^6$ ohms-cm, on an aluminum core having a length of ~60 mm, an outside diameter of 50 mm, and a thickness of 1.5 mm. The paint sprayer was held approximately 15–24 cm away from the rotating transfer roll and passed back and forth so as not to create any drips, sag marks, or inconsistent heavy or light spots. The roll was dried in air for 30 minutes and then cured at 150° C. for 15 minutes. The dry thickness of the overcoat layer was approximately 25 microns. A well-cured, durable, adherent coating was obtained. The volume resistivity of the coated roll was found to have a volume resistivity of $5\times10^9$ ohm-cm.

Example 5

The remaining solution from Example 4 was applied using the same technique onto a roller with an aluminum core and covered with a compliant layer of polyurethane elastomer that was 3.2 mm thick over another aluminum roll similar to that in Example 4. The compliant layer was polyurethane of 3.2 mm thick. A dry elastomeric fluorosilicone coating of 30 microns thick was obtained. The uncured fluorosilicone layer was found to be 30 microns thick, as measured by a laser gauge. This was allowed to dry in air for 30 minutes, and then cured in an oven 30 minutes at 120° C. A well-cured, durable, adherent coating was obtained. A durable elastomeric coating was obtained with excellent adhesion to the roller.

Test

The cured overcoat of Example 1 was tested for absorption of an aliphatic hydrocarbon. A 6.45 $mm^2$ sample of the material was cut out and weighed on an analytical balance. The weight was recorded. The sample was then immersed in a hydrocarbon, Norpar™ 12 (commercially obtained from Exxon, Fairfax, Va.) for two hours. The sample was removed and patted dry with an absorbent paper towel and reweighed. The total weight gain was less than 1% based on dry resin weight. Comparative Example A could not be tested because of poor adhesion to the substrate, and when patted dry, delamination from the substrate occurred, making an accurate weighing impossible.

The cured overcoat of Example 1 was tested on a Taber Abraser (commercially obtained from Taber Industries, North Tonawonda, N.Y.). A 250 gram load was used with a single CS-10F abrasion wheel. The sample was run for 75 cycles before being worn away. Comparative Example A was worn away after 30 cycles under the same testing condition.

What is claimed is:

1. An intermediate transfer member for the transfer of electrophotographic toner images comprising:

(a) a substrate; and (b) a polymeric layer on said substrate, the polymeric layer having a surface that can carry an electrophotographic image on the surface of the polymeric layer and the surface on the polymeric layer can transfer that image to another surface wherein the polymeric layer comprises an organic titanate and a polymer selected from the group consisting of fluorosilicone polymers, silicone polymers, and a combination thereof.

2. An intermediate transfer member according to claim 1 wherein said intermediate transfer member is in the shape of an endless belt.

3. An intermediate transfer member for the transfer of electrophotographic toner images comprising:

(a) a substrate; and (b) a polymeric layer on said substrate wherein the polymeric layer comprises an organic titanate and a polymer selected from the group consisting of fluorosilicone polymers, silicone polymers, and a combination thereof and wherein said intermediate transfer member is in the shape of a drum.

4. An intermediate transfer member for the transfer of electrophotographic toner images comprising:

(a) a substrate; and (b) a polymeric layer on said substrate wherein the polymeric layer comprises an organic titanate and a polymer selected from the group consisting of fluorosilicone polymers, silicone polymers, and a combination thereof and wherein said intermediate transfer member is in the shape of a cylinder.

5. An intermediate transfer member according to claim 3 wherein said organic titanate is selected from the group consisting of alkoxy titanates, ortho titanate esters, and a combination thereof.

6. An intermediate transfer member according to claim 4 wherein said polymer comprises at least two functional groups selected from the group consisting of hydroxyl group, acetoxy group, and a combination thereof.

7. The intermediate transfer member of claim 1 having an electrophotographic image distributed over a surface of the polymeric layer.

8. The intermediate transfer member of claim 2 having an electrophotographic image distributed over a surface of the polymeric layer.

9. The intermediate transfer member of claim 3 having an electrophotographic image distributed over a surface of the polymeric layer.

10. The intermediate transfer member of claim 4 having an electrophotographic image distributed over a surface of the polymeric layer.

11. The intermediate transfer member of claim 5 having an electrophotographic image distributed over a surface of the polymeric layer.

* * * * *